UNITED STATES PATENT OFFICE.

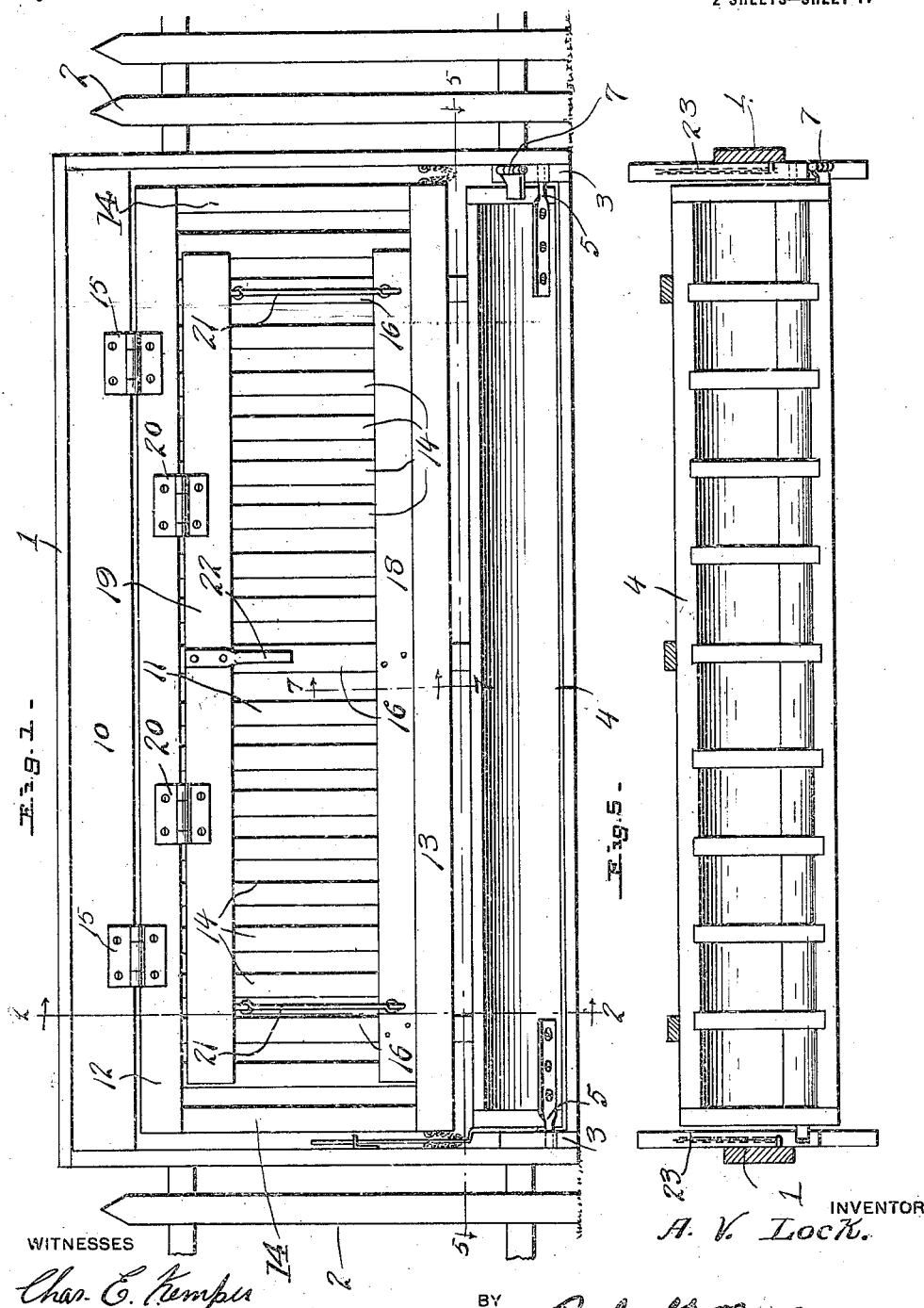

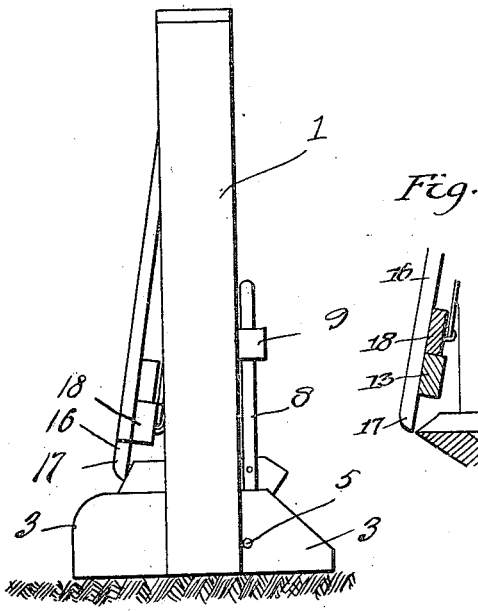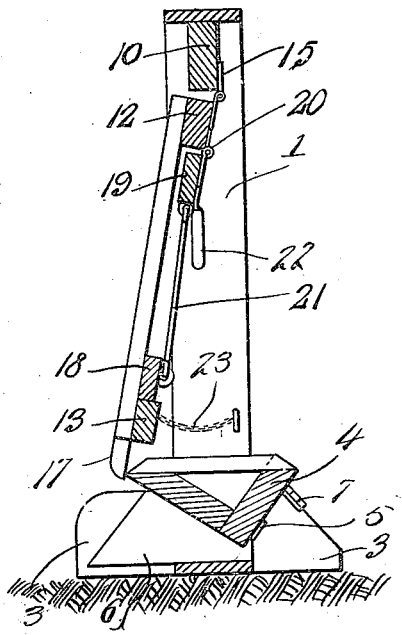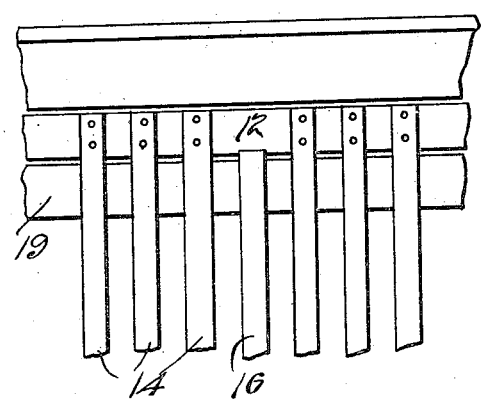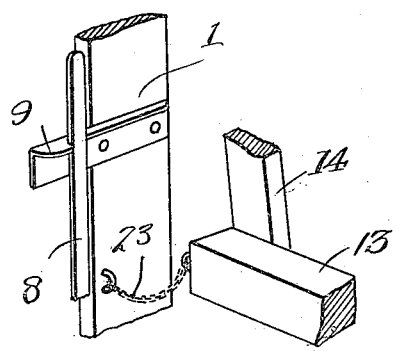

A. V. LOCK, OF KANSAS CITY, MISSOURI.

HOG-TROUGH.

1,259,112.      Specification of Letters Patent.     Patented Mar. 12, 1918.

Application filed June 12, 1916. Serial No. 103,255.

*To all whom it may concern:*

Be it known that I, A. V. LOCK, a citizen of the United States, residing at Kansas City, in the county of Jackson and State of Missouri, have invented certain new and useful Improvements in Hog-Troughs, of which the following is a specification.

This invention has relation to hog troughs, and the nature and objects thereof will be readily apparent to those engaged in stock raising, in the light of the following explanation of the accompanying drawings, illustrating what I now believe to be the preferred embodiment, or mechanical expression of my invention, from among other forms and arrangements within the spirit thereof and the scope of the appended claims.

However, an object of the invention is to provide a hog trough adapted to be disposed in alinement with fencing, and to form a part thereof, and having means for excluding the animals from the troughs, during such time when the trough is to be cleaned or filled.

Another object of the invention is to provide a hog trough having the above mentioned characteristics, and having means for pivotally supporting the same, so that it may be readily and quickly emptied of its contents.

In addition to the foregoing my invention comprehends improvements in the details of construction and arrangement of parts to be hereinafter described and particularly pointed out in the appended claims.

In the accompanying drawings in which similar and corresponding parts are designated by the same characters of reference throughout the several views in which they appear:—

Figure 1, is a view in rear elevation of a hog trough constructed after the manner of my invention.

Fig. 2, is a vertical section on the line 2—2 of Fig. 1.

Fig. 3, is an end view thereof.

Fig. 4, is a detail view of the upper portion of the gate illustrating the operation of the latching mechanism.

Fig. 5, is a horizontal section on the line 5—5 of Fig. 1.

Fig. 6, is a detail perspective view of the trough lever, and latch for the same.

Fig. 7, is a detail view taken on the line 7—7 of Fig. 1.

With reference to the drawings, 1 indicates a vertically disposed rectangular frame, forming a part of a fence 2, and providing an opening through said fence, which opening however is normally closed by means of a gate to be presently described. Transverse supports 3 are provided at the lower portion of each end of the frame, to afford support therefor. The frame may be anchored to the ground by any suitable means.

The trough 4, is of the usual type, V-shaped in cross section and provided at each end with trunnions 5 journaled in the supports 3 thereby providing pivotal support for the trough. It will be noted that the trunnions are mounted on the trough at one side of its vertical longitudinal center of gravity, whereby the trough is disposed to overbalance toward the left with reference to Fig. 2. As a support for the trough when in the position just mentioned, the ends thereof are extended below the trough, and indicated at 6 to form supporting members therefor. To prevent premature or accidental upsetting of the trough, I provide a securing means in the form of a hinge 7 having one leaf thereof secured to one of the supports 3, with the other leaf thereof adapted to be engaged against the side of the trough. A lever 8 is provided with its lower end secured to one end of the trough, and is extended upward and engaged behind a latch member 9, when the trough is in operative position.

A beam 10 is disposed longitudinally in the upper portion of the rectangular frame, and is designed to support an oscillatable gate designated 11 as an entirety. The gate includes horizontal upper and lower frame bars 12 and 13 respectively, connected by vertical spaced slats or palings 14. The upper frame bar 12 of the gate is hingedly secured to the beam 10 by means of hinges 15. Thus it will be seen the gate is capable of oscillation in a direction transversely of the frame, and its lower edge adapted to be positioned adjacent either longitudinal edge of the trough, such movement possessing a significance which will presently appear.

A slat 14 is omitted at uniform intervals, to provide space for vertical latch bars 16, which are however extended below the lower edge of the gate as at 17. The latch bars 16 are nailed or otherwise secured to a longitudinal beam 18, which is disposed at the rear side of the gate, and is adapted to rest upon the beam 13 of the gate. A longitudinal bar 19 is hingedly secured at one edge to the upper frame bar 12 of the gate, by means of hinges 20. Links 21 are flexibly connected at either end to the bars 18 and 19. A handle 22 may be provided upon the bar 19, and its preferred location is illustrated in the drawings.

The method of operation, assuming with reference to Fig. 2, that the left side of the trough faces the animal inclosure, and the right, that side from which the animals are fed, the trough is filled, and it will be noted that owing to the position of the gate, the trough is inaccessible to the animals. The gate is retained in such position by the engagement of the ends 17 of the latch bar 16 with the left hand edge of the trough. When the animals are to be fed, the handle 22 is grasped and raised, thereupon raising the bar 18 to which the latch bars are secured. The latch bars becoming obviously disengaged from the trough, the gate may be swung to the rear thereby exposing the trough within the animal inclosure. The gate is brought to rest and secured against displacement by permitting the latch bars to descend for engagement with the right hand edge of the trough. The movement of the gate in either direction is limited by means of flexible members 23 secured at either of their ends to the gate and upright members of the frame 1.

When the trough is to be emptied, the gate is retained in the position of Fig. 2, and the leaf of the hinge member 7 thrown back out of the path of movement of the trough, whereupon by moving the lever 8 to the right (see Fig. 3), subsequent to its disengagement from the latch 9, the trough is rotated and brought to emptying position.

It will be apparent that the animals are given no opportunity to pass through the frame of the trough, and consequently the feeding of a large herd of hogs may be accomplished by one attendant. The facility with which the trough is cleaned renders this invention especially desirable. A very important feature of the trough is the easy manner in which it is operated if the farmer who uses it should be away he could leave the feeding to younger members of the family and feel that the feeding was being carried out in a proper manner. The feed may be placed in the trough and allowed to settle to a level equally distributing the feed before the animals are admitted.

When young pigs are started on solid food they may be fed with reasonable assurance that they will each get the right amount and lessen the possibility of scours in a few that would get an over feed.

In freezing weather the trough may be dumped and emptied of its contents after feeding or watering and the trough is ready for the next feed or water when the time arrives. After a heavy rain the trough if left in a horizontal position may be emptied of the water without soiling the hands, if left in a dumped position it is always empty and cannot freeze, and unlike other troughs cannot freeze to the ground or mud in the lot if left dumped. In feeding one does not have to go into the lot and clean or right the trough or to place the feed into it, in hot weather the hogs cannot get into the trough or turn it over.

While I have illustrated and described my invention with some degree of particularity, I realize that in practice various alterations may be made thereover, and I therefore reserve the right and privilege of changing the form of the details of construction, or otherwise altering the arrangement of the correlated parts without departing from the spirit of the invention or the scope of the appended claims.

Having thus described my invention what I claim as new and desire to secure by Letters Patent is:—

1. In an animal feeding apparatus, a frame, a trough located within the frame, a gate hingedly mounted on the frame for movement transversely of the trough, a bar hingedly connected to the gate, a second bar, links connecting said bars, latch bars depending from the second bar to engage either edge of the trough, and a handle for oscillating the first bar whereby to withdraw the latch bars from engagement with the trough to permit the gate to be swung to expose the trough at one side or the other of the gate.

2. In an animal feeding apparatus, a frame, a trough located within the frame, a gate hingedly mounted on the frame for movement transversely of the trough comprising top and bottom horizontal bars and vertical connecting end bars, vertical slats connecting the horizontal bars, a bar disposed in contiguous relation to the top bar of the gate and hingedly connected thereto, a second bar disposed in contiguous relation to the bottom bar of the gate, links pivotally connecting said last mentioned bars, latch bars slidable vertically in engagement with the horizontal gate bars, adapted to project below the gate and secured to the lower one of the last mentioned bars, and a handle on the top hingedly mounted bar for oscillating the same whereby the lower bar connected thereto and the latch bars may be moved to withdraw the latch bar from engagement with the trough, whereby to permit the gate to be swung to expose the trough at one side or the other of the gate.

In testimony whereof I affix my signature in presence of two witnesses.

A. V. LOCK.

Witnesses:
 BESSIE M. LOCK,
 H. C. NEWCOMER.

Copies of this patent may be obtained for five cents each, by addressing the "Commissioner of Patents, Washington, D. C."